H. H. MERCER.
CHANNELING MACHINE.
APPLICATION FILED JULY 6, 1918.
1,304,524.
Patented May 20, 1919.
2 SHEETS—SHEET 1.
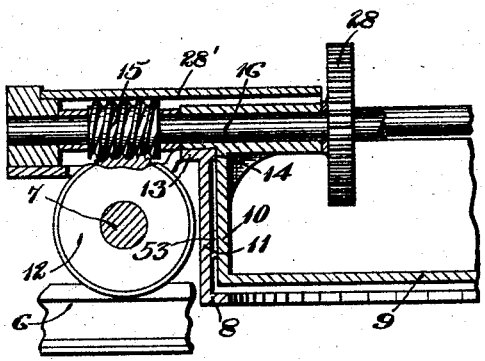
Fig. 2.
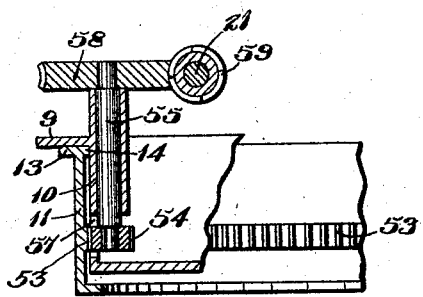
Fig. 4.
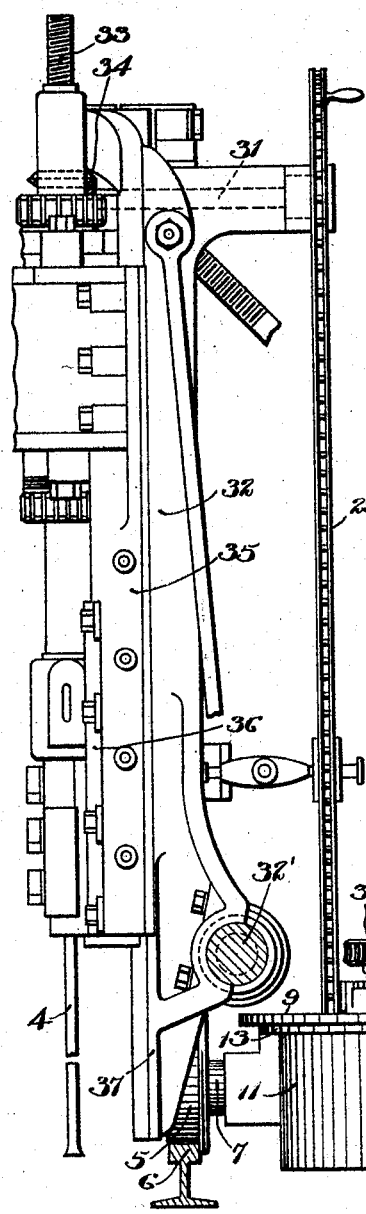
Fig. 1.
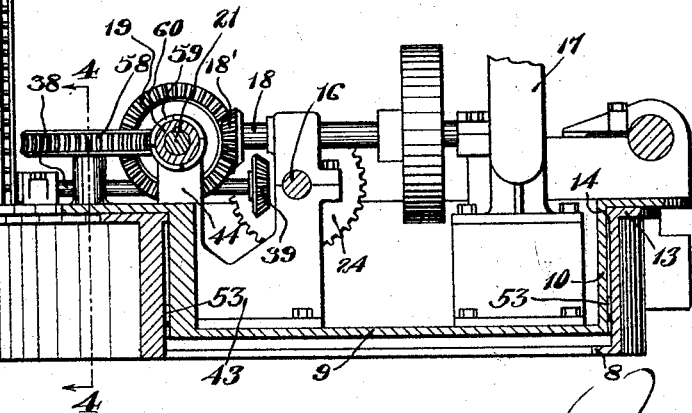
Inventor:
Henry H. Mercer.
by
Atty.

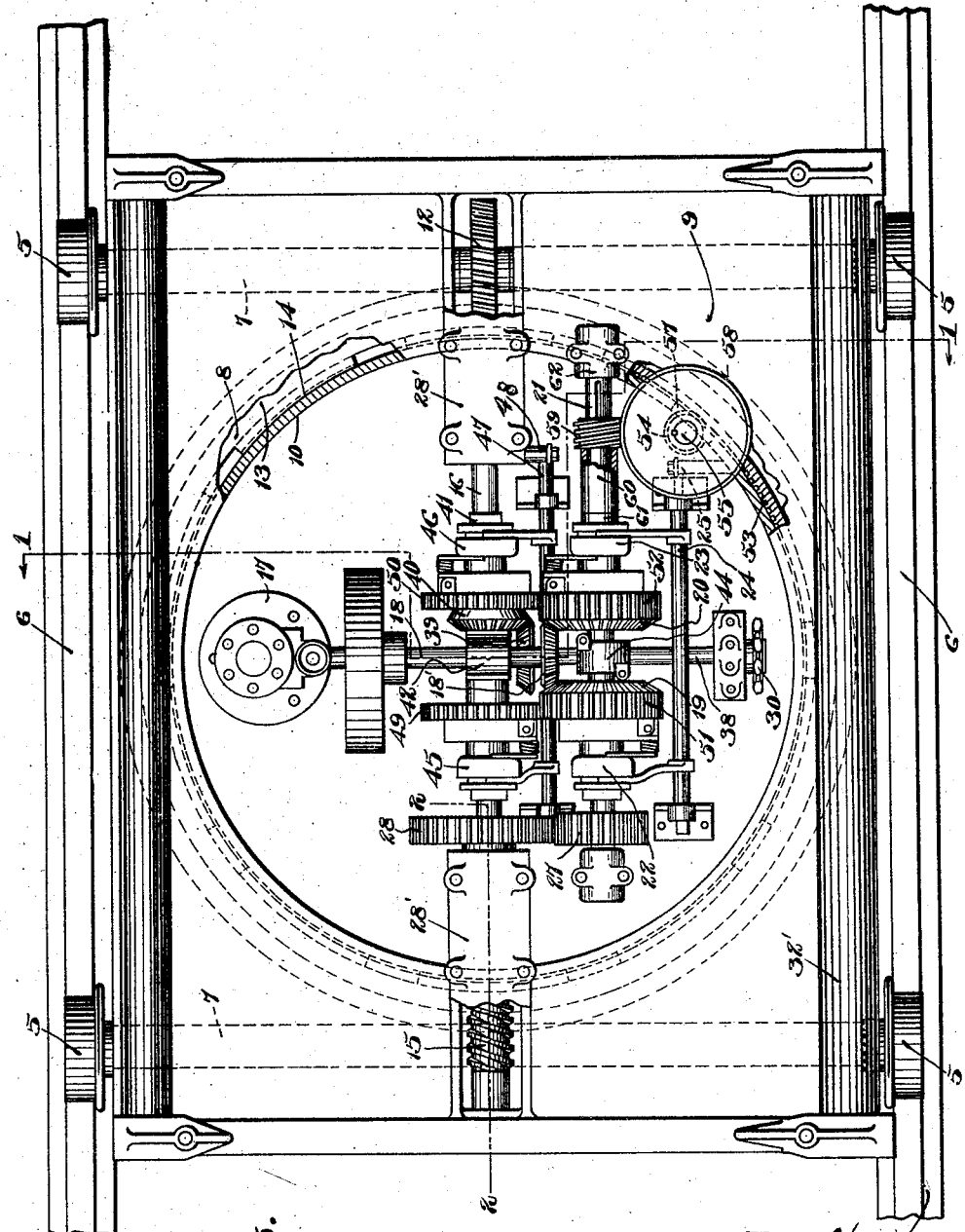

UNITED STATES PATENT OFFICE.

HENRY H. MERCER, OF CLAREMONT, NEW HAMPSHIRE, ASSIGNOR TO SULLIVAN MACHINERY COMPANY, A CORPORATION OF MASSACHUSETTS.

CHANNELING-MACHINE.

1,304,524.      Specification of Letters Patent.      Patented May 20, 1919.

Continuation in part of application Serial No. 744,347, filed January 27, 1913. This application filed July 6, 1918. Serial No. 243,631.

*To all whom it may concern:*

Be it known that I, HENRY H. MERCER, a citizen of the United States, residing at Claremont, in the county of Sullivan and State of New Hampshire, have invented certain new and useful Improvements in Channeling-Machines, of which the following is a full, clear, and exact specification.

This invention relates to channeling machines, and more particularly to track channeling machines. Its object is to provide means for making a quick adjustment of the channeling tool from one side of the track to the other so that a plurality of parallel grooves may be cut without shifting the trackway.

The trackway for a channeling machine is customarily formed of connected sections composed each of parallel united rails, the sections being laid to form a continuous straight trackway and brought to a level or into alinement by means of blocks placed beneath the rails.

The labor of shifting such a trackway and adjusting it to a new position forms a very large proportion of the labor involved in the channeling operation. This is especially the case with modern high powered channeling machines where the machines, and consequently the trackway, are very heavy and cumbersome, and is also especially the case in channeling relatively soft stone, where the cut is quickly made, while the shifting of the trackway requires the same amount of time and labor.

The object of the present invention is to provide means whereby the channeling tool may be easily and expeditiously reversed in its relation to the trackway so that after completing a channel groove at one side of the trackway, it may be caused at will to overhang the opposite side of the trackway and cut a second parallel channel groove thereat. The number of times the trackway must be shifted, blocked up, and placed in alinement is thereby reduced one-half, it being necessary to move the trackway once only for each two cuts. This materially reduces the time and expense of the channeling operation.

The invention may be carried out in various ways, but, as disclosed in the illustrative embodiment herein described, the reversal of the channeling tool is obtained by providing a turntable on the truck of the channeling machine, which turntable carries the channeling devices and preferably, though not necessarily, the tool feeding and truck driving devices. The turntable may be quickly turned to cause the tool to overhang either side of the truck and to cut a groove at either side of the trackway.

The invention will be best understood by reference to the following description when taken in connection with the accompanying illustration of one specific embodiment thereof, while its scope will be more particularly pointed out in the appended claims.

In the drawings,—

Figure 1 shows, partly in end elevation and partly in section, on the line 1—1, Fig. 3. with certain parts removed, a channeling machine embodying one form of the invention.

Fig. 2 is a sectional elevation on an enlarged scale taken on the line 2—2 in Fig. 3.

Fig. 3 is a plan view of the channeling machine shown in Fig. 1, the standard and cutting appliances being omitted.

Fig. 4 is a vertical section on the line 4—4, Fig. 1.

Referring to the drawings and to the embodiment of the invention there submitted for illustrative purposes, I have shown a track channeler carrying the usual gang 4 of channeling tools mounted upon the truck wheels 5, the latter adapted to move along the usual rails 6, which are customarily united into connected sections to form a portable trackway laid along the quarry bottom. Herein the truck wheels are mounted upon axles 7 which carry the main truck support 8 constituting a member having a fixed relation to opposite sides of the trackway. That is to say, although the relation of the tool gang and tool actuating parts to be described is reversed with reference to the trackway in cutting a second or parallel groove, the relation of the truck support to the trackway remains unchanged.

To reverse the channeling devices with reference to the trackway, channeling mechanism is carried on the truck through means of an intermediate reversible support in the form of a turntable or rotatable platform 9. The turntable is in the form of a rectangular frame having a cylindrical, central depression 10 which is located within a similar centrally depressed part 11 of the truck frame. The main truck portion is also in the form of a rectangular frame carrying the two axles with their four wheels, each axle being provided with a worm gear 12, preferably located in a central longitudinal plane, i. e., substantially midway between the rails.

The upper platform or turntable is adapted to rest upon a finished ring or surface 13 presented by the truck frame, and is centered to turn about a central axis by means of segmental projections 14 which constitute side bearings and engage the walls of the cylindrical depression 10 on the turntable.

This arrangement provides that the platform can be reversed by merely reversing the turntable and bringing all the operative parts of the channeler into the same relation to one side of the trackway which they previously bore to the opposite side thereof.

Any suitable means for propelling the channeler may be employed, but herein each worm gear 12 is adapted to be engaged by one of two worms 15 mounted upon the worm shaft 16, the latter being driven from any suitable motor, such as the upright truck driving motor 17, through appropriate transmission gearing. Herein the engine 17 has the drive shaft 18 which turns the two bevel gears 19 and 20 on the countershaft 21 in opposite directions by means of the bevel driving pinion 18'.

Clutch devices 22 and 23 of well known construction, moved by the slide rod 24 and the actuating lever 25, are employed to clutch either beveled gear at will to the countershaft 21. The latter carries the driving gear 27 which meshes with the driven gear 28, the latter secured to the worm shaft 16. By this means the worm shaft may be connected to be driven by either driving gear 19 or 20, while the remaining gear is disconnected, or both gears may be disconnected, whereby the truck may be driven in one direction or the other or held at rest. The worms 15 are carried in boxes 28' (see Fig. 2) the under sides of which are open so that when the turntable is turned through 180° one worm may be withdrawn from its gear and swung into mesh with the opposite gear, and the remaining worm simultaneously brought into engagement with the first gear.

Preferably the tool feeding mechanism is also carried upon the turntable. For this purpose the tool feed driving chain 29 is employed, driven from the sprocket wheel 30 and adapted to turn the transverse shaft 31 journaled near the top of the standard 32. This is adapted to turn the usual feed screw 33 through the bevel gears 34 so as to advance the sliding frame 35 which carries the tool actuating engine and the crosshead guides 36 on the standard guideways 37. The standard is adjustably supported at the side of the truck upon the trunnion shaft 32' extending lengthwise the truck.

Referring now to the mechanism for driving the sprocket wheel 30 for the tool feed, the latter is mounted upon a shaft 38 carrying a bevel pinion 39 which meshes with a bevel gear 40, the latter carried by a driving sleeve 41 which is mounted for free rotation about the worm shaft 16 and in a journal provided by the upright support 42. The latter is carried by the supporting member 43 bolted to the turntable and also provides an upright support 44 for the drive shaft 38 and the countershaft 21. For turning the driving sleeve 41 in either direction at will, thereby to raise or lower the tools, the sleeve is provided at opposite ends with the clutch devices 45 and 46. By means of the actuating rod 47 and lever 48 these may be used to clutch the drive sleeve 41 to or unclutch the same from the oppositely driven gears 49 and 50, which latter are rotatably mounted on the worm shaft 16 and mesh with gears 51 and 52 connected respectively to or formed integral with the bevel gears 19 and 20 on the countershaft 21. By throwing the actuating lever 48, the driving sleeve 41 may be clutched to either gear 49 or 50 at will for raising or lowering the tool, or may be unclutched from both gears to leave the tool fixed, and these conditions may be had irrespective of the direction of travel of the truck.

For operating the turntable 9 to reverse the channeling devices, the centrally depressed part 11 of the truck frame 8 is provided with an internal annular rack 53 which is engaged by a pinion 54 fast upon an upright shaft 55 journaled in a bearing 56 carried by the cylindrical portion 10 of the turntable, the latter being provided with a suitably disposed opening 57 to receive the pinion 54 and permit the same to engage the rack 53. Keyed or otherwise secured to the shaft 55 is a worm gear 58 which meshes with a worm 59 on a sleeve 60 having a splined connection with the countershaft 21, whereby said sleeve and worm are caused to rotate with said shaft but are permitted longitudinal movement thereon, the extent of said movement being limited by collars or equivalent stops 61 and 62 which are engaged by opposite ends respectively of said sleeve 60. Said collars or stops are so positioned that when the sleeve 60 engages the collar 61 the worm 59 is in engagement with the worm gear 58, and when said sleeve engages the stop 62 said worm and worm gear are out of engagement. When the shaft 21 is rotated in one direction (the parts being in the position shown in Fig. 3), the sleeve 60 is held against longitudinal movement by engagement of the left end thereof with the collar 61, thereby causing the worm 59 to actuate the gear 58 and, through the pinion 52 and rack 53, to turn the turntable. When, however, the shaft 21 is rotated in the opposite direction, the sleeve 60, being free to slide on the shaft, will merely move toward the right, carrying the worm 59 out of engagement with the gear 58 without turning the latter, the parts remaining in this position during the normal operation of the machine. When it is desired to turn the turntable, the sleeve 60 is moved by hand toward the left into the position shown in Fig. 3, and the shaft 21 connected with the motor for rotation in the direction to retain the parts in this position and cause the worm to rotate the gear 58. Thereupon the turntable will be turned by the pinion 54 and rack 53, the worms 15, upon the initial movement of the turntable, immediately moving out of mesh with their gears 12. When the turntable has been rotated through 180°, bringing the worms 15 again into engagement with their gears, the mechanism is stopped and the shaft 21 momentarily reversed to disengage the worm 59 from the gear 58, whereupon the machine is in condition to proceed with the channeling operation.

While I have herein shown and described for purposes of illustration one specific embodiment of the invention, it is to be understood that extensive deviations may be made from the illustrative form and constructional details therein shown without departing from the spirit thereof.

What I claim as new and desire to secure by Letters Patent is:

1. A reversible track channeling machine having a main truck support, a platform rotatably mounted thereon, having a centrally depressed portion, tool feeding and truck propelling devices mounted on said platform in said depressed portion, channeling means carried by said platform including a supporting standard, a channeling tool, and tool actuating means, said platform being completely reversible on said truck support whereby the tool may be caused to overhang and cut a groove at either side of the trackway.

2. In a reversible track channeling machine, the combination with a channeling tool, of a supporting truck adapted to travel on a straight trackway, a pivotally mounted tool support movable into a vertical plane beyond the edge of said truck, and rotatable means on said supporting truck and adjustable to hold said support and said tool to cut a vertical channel at either side of said trackway at will.

3. A reversible track channeling machine having a truck support, a channeling tool, a standard and a reversible support for said standard, said reversible support being rotatably mounted upon said truck support, truck propelling devices carried by said reversible support including a driving shaft with a driving worm thereon, and propelling devices carried by the truck including a worm gear adapted to be engaged with or disengaged from said driving worm.

4. A reversible track channeling machine having a truck support, a channeling tool, a standard and a reversible support for said standard, said reversible support being rotatably mounted upon said truck support, truck propelling devices carried by said reversible support including a pair of driving gear members, and propelling devices carried by the truck including a pair of driven gear members adapted to mesh with said driving gear members, the reversal of said reversible support being adapted to reverse the relation between the driving and driven gear members.

5. In a channeling machine, the combination with a truck adapted to travel upon a trackway, of cutting appliances, a support for said cutting appliances reversibly mounted upon said truck whereby the cutting appliances may be directed to cut at either side of the trackway, and truck propelling mechanism including means for reversing the direction of truck travel also mounted upon said reversible support.

6. In a channeling machine, the combination with a truck adapted to travel upon a straight trackway, of a platform support reversibly mounted upon said truck, a standard support at the side of the platform extending longitudinally of the same, and a standard and channeling devices carried thereby whereby said channeling devices may be directed to cut a vertical channel groove at either side of the trackway.

7. In a channeling machine, the combination with a truck support, of an intermediate support having a depressed portion adapted to turn thereon, said truck support presenting a circular guideway therefor and having a depressed portion adapted to receive the depressed portion of the intermediate support, truck propelling mechanism carried by said intermediate support and located in the centrally depressed portion of said intermediate support, and a standard carrying cutting appliances mounted at the side of said intermediate support whereby the same may be presented on opposite sides of the channeling machine.

8. A reversible track channeling machine having a truck support, a channeling tool, a standard and an intermediate reversible support for said standard, said reversible support being rotatably mounted upon said truck support, truck propelling devices carried by said reversible support, and truck propelling gearing carried by said truck support and adapted to be engaged and driven in either the normal or reverse position of the said reversible support whereby said machine may be operated and the truck propelled with the tool at either side of the trackway.

9. A reversible track channeling machine having a truck support, a channeling tool, a standard and an intermediate reversible support for the standard, said reversible support being reversibly mounted upon said truck support, tool feeding devices carried by said standard, motor driven actuating means therefor carried by said reversible support, truck propelling devices carried by said reversible support, and truck propelling gearing carried by said truck support and adapted to be engaged by said propelling devices on the reversible support in either the normal or reverse position of the latter.

10. In a reversible channeling machine, a truck support having axle members, driven members on said axle members, a reversible support carried on said truck support, a driving shaft carried on said reversible support having a driving member thereon engageable with the driven members on said axles, a motor mounted on said support, operative connections between said motor and said shaft, a channeler standard carried on said reversible support, channeling appliances adjustable longitudinally of said standard, adjusting mechanism therefor including a shaft journaled on said reversible support, and operative connections between said last named shaft and said motor.

11. In a reversible track channeling machine, in combination, a truck adapted to travel on a fixed trackway, a channeling tool adapted to cut a channel at the side of said trackway as said truck is moved thereon, a reversible support on said truck by which said channeling tool is carried, said support being adjustable to cause said tool to cut a channel at either side of said trackway, and mechanism for turning said support.

12. In a reversible track channeling machine, in combination, a truck adapted to travel on a fixed trackway, a channeling tool adapted to cut a channel at the side of said trackway as said truck is moved thereon, a reversible support on said truck by which said channeling tool is carried, said support being adjustable to cause said tool to cut a channel at either side of said trackway, and mechanism for alternatively propelling said truck on said trackway and turning said support on said truck.

13. In a reversible track channeling machine, in combination, a truck adapted to travel on a fixed trackway, a channeling tool adapted to cut a channel at the side of said trackway as said truck is moved thereon, a reversible support on said truck by which said channeling tool is carried, said support being adjustable to cause said tool to cut a channel at either side of said trackway, a motor for propelling said truck, and means actuated by said motor for turning said support.

14. In a reversible track channeling machine, in combination, a truck adapted to travel on a fixed trackway, a channeling tool adapted to cut a channel at the side of said trackway as said truck is moved thereon, a reversible support on said truck by which said channeling tool is carried, said support being adjustable to cause said tool to cut a channel at either side of said trackway, truck propelling devices including a driving worm carried by said support and a worm gear carried by said truck and adapted to be engaged with or disengaged from said worm as said support is turned, a motor, a shaft actuated by said motor and operatively connected with said propelling devices, and mechanism for turning said support including a worm gear and a driving worm mounted on said shaft for rotation therewith and longitudinally movable thereon into and out of engagement with said last named worm gear.

15. A reversible track channeling machine having a main truck support adapted to run on a straight trackway laid on a floor, a platform rotatably mounted upon said truck support, channeling devices mounted on said platform including channeling tools, tool actuating means, and a tool supporting standard, and a truck driving mechanism on said rotatable platform, said platform being completely reversible on said truck support whereby the channeling devices may be directed to cut a lateral groove in the floor at either side of said trackway at will.

16. In a reversible track channeling machine, a truck support movable over the floor, a platform thereon, a standard on said platform, a channeling tool carried upon said standard, and means for completely reversing said platform relative to said truck to permit a complete reversal of the tool with relation to the truck whereby lateral grooves may be cut on either side of said truck support in the floor.

17. In a channeling machine, the combination with a main trunk support adapted to travel upon a straight trackway laid on a floor, of a standard, a standard support at the side of the truck extending longitudinally of the same and of said trackway, and means for reversing the relation of the standard support relative to the truck and trackway whereby the channeling machine may be caused to cut a channel groove in the floor at either side of the straight trackway at will.

18. In a channeling machine, the combination with a truck adapted to travel upon a straight trackway laid on a floor, of a platform support reversibly mounted upon said truck, a standard support at the side of the platform extending longitudinally of the same and reversible therewith relative to the truck and trackway, and a standard and channeling devices carried thereby whereby said channeling devices may be directed to cut a lateral channel groove in the floor at either side of the straight trackway.

19. In a channeling machine, the combination with a truck support adapted to travel upon a trackway laid on a floor, of an intermediate reversible support, and a standard with cutting appliances carried by said intermediate support, said intermediate support being adapted to turn continuously upon a circular guideway presented by said truck support to reverse completely the cutting appliances and present them to the work at the opposite sides of the trackway for cutting lateral grooves at either side thereof in the floor.

In testimony whereof I affix my signature.

HENRY H. MERCER.

Copies of this patent may be obtained for five cents each, by addressing the "Commissioner of Patents, Washington, D. C."